April 28, 1970     F. C. KAISER     3,508,702
CREDIT CARD MAILING ASSEMBLY
Filed Nov. 1, 1968     2 Sheets-Sheet 1
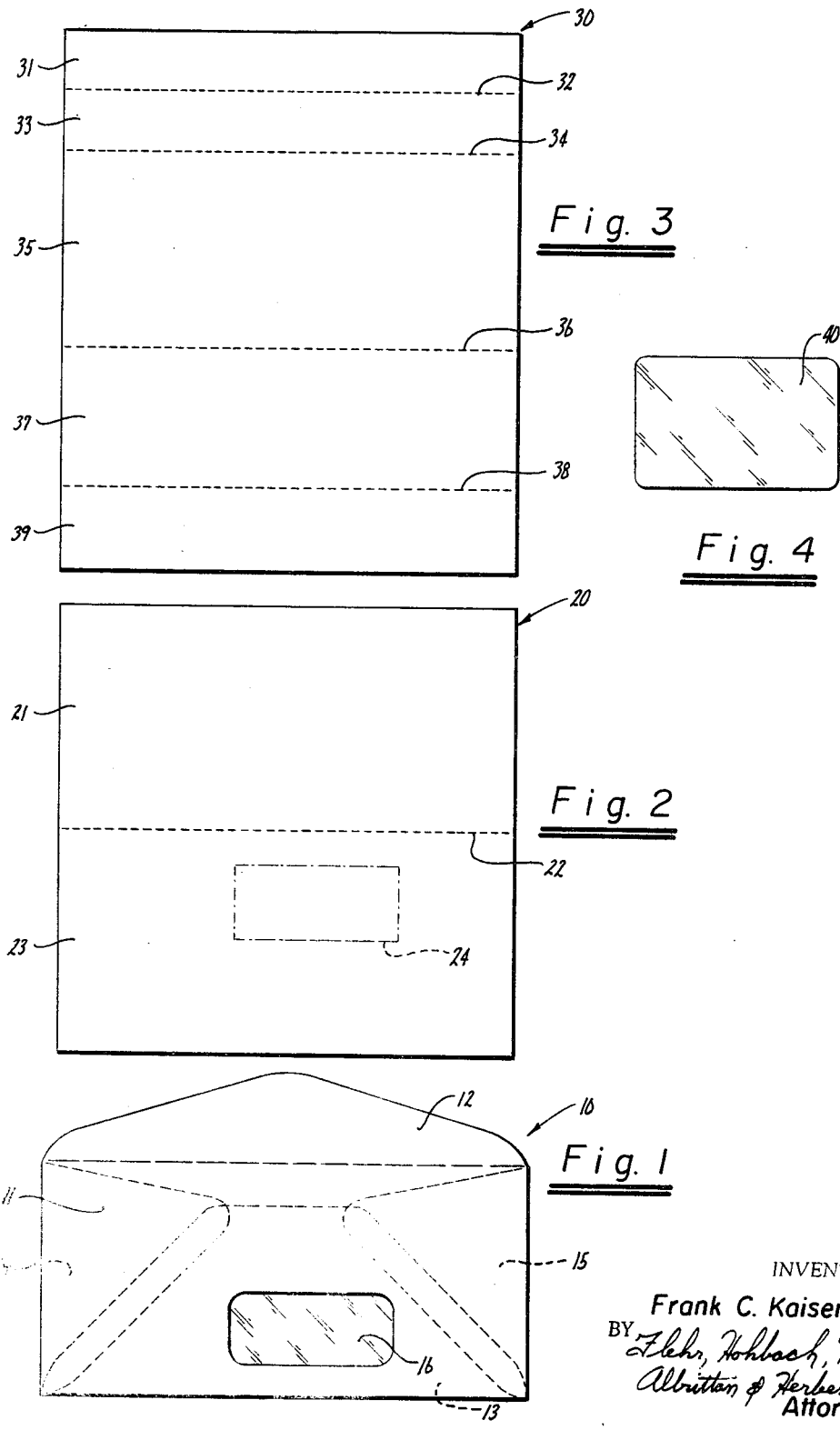
INVENTOR.
Frank C. Kaiser
BY Flehr, Hohbach, Test,
Albritton & Herbert
Attorneys

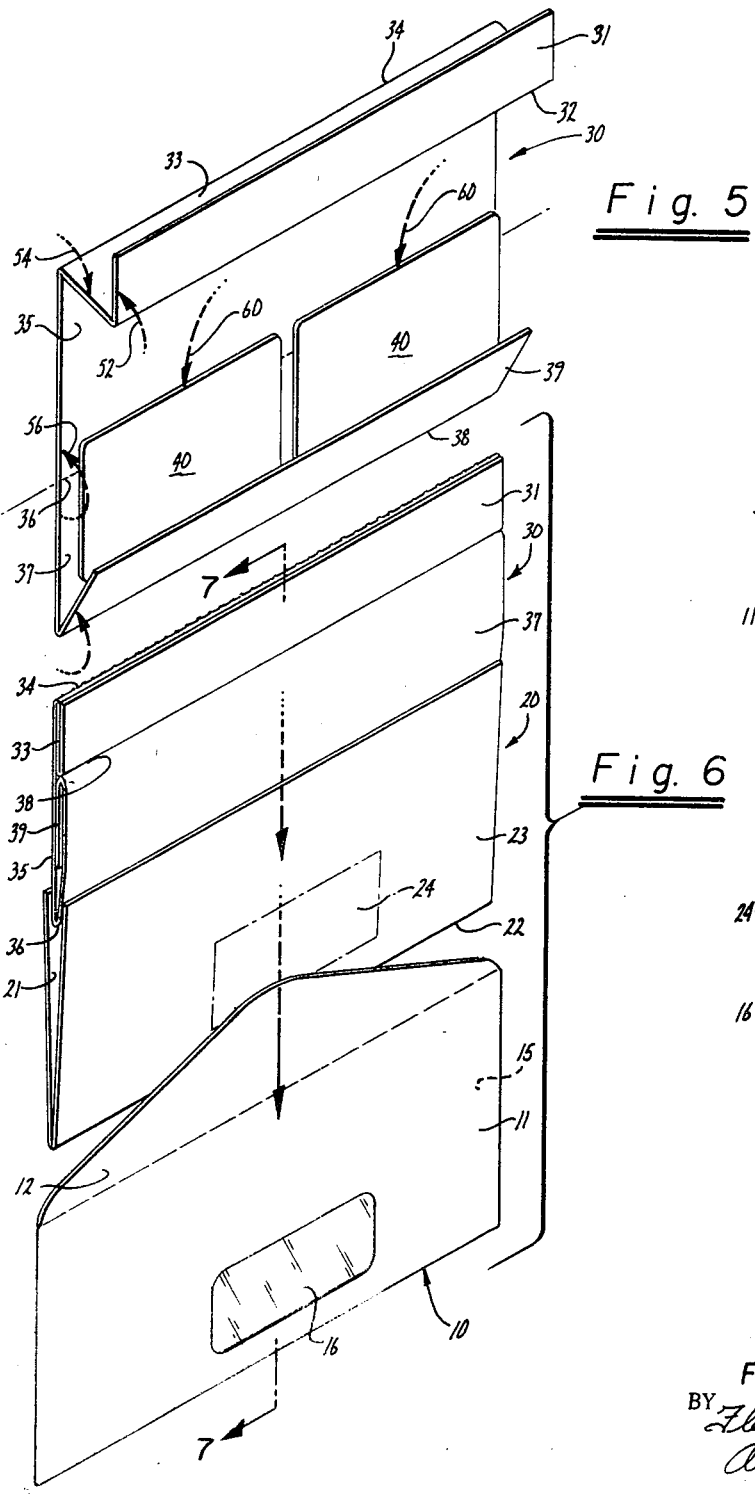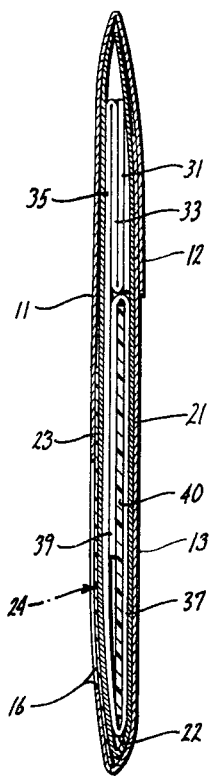

United States Patent Office 3,508,702
Patented Apr. 28, 1970

3,508,702
CREDIT CARD MAILING ASSEMBLY
Frank C. Kaiser, San Francisco, Calif., assignor to Wells Fargo Bank, National Association, San Francisco, Calif.
Filed Nov. 1, 1968, Ser. No. 772,737
Int. Cl. B65d 27/04
U.S. Cl. 229—71             11 Claims

ABSTRACT OF THE DISCLOSURE

Credit card mailing assembly comprising two foldable members enclosed in an envelope, said foldable members being of a weight and thickness and folded in such a manner to provide protection against theft of or damage to the credit cards.

BACKGROUND OF THE INVENTION

In recent years, it has become a common practice for business firms to send credit cards through the mail to potential users. Frequently, the cards are merely enclosed in a conventional envelope together with a brief letter or other descriptive material. Such packaging makes possible easy detection of the credit cards and invites theft of the cards.

SUMMARY AND OBJECT OF THE INVENTION

The credit card mailing assembly of the present invention includes two foldable members enclosed in an envelope, said foldable members being of a weight and thickness and folded in such a manner to provide protection against theft of or damage to the credit cards. The foldable members also provide space for the printing of information such as the terms upon which the cards are tendered and instructions pertaining to their use.

In general, therefore, it is an object of the present invention to provide an improved credit card mailing device.

Another object of the invention is to provide a credit card mailing device in which the presence of credit cards cannot be readily detected from the outside of the envelope.

Another object of the invention is to provide a credit card mailing device which makes it difficult to detect whether a credit card is enclosed.

Another object of the invention is to provide a credit card mailing device which protects the cards from damage during transit in the mails.

Another object of the invention is to provide a credit card mailing device which includes space for printed matter concerning instructions on the use of the cards and the terms of the credit agreement.

Additional objects and features of the invention will be apparent from the following description in which the preferred embodiment is set forth in detail in conjunction with the accompanying drawing.

BRIEF DESCRIPTION OF THE DRAWING

FIGURE 1 is a front view of an envelope used in the present invention.

FIGURE 2 is a plan view of the first foldable member.

FIGURE 3 is a plan view of the second foldable member.

FIGURE 4 is a plan view of a credit card of the type to be mailed with the present invention.

FIGURE 5 is a perspective view of the second foldable member in a partly folded condition.

FIGURE 6 is an exploded view of a credit card mailing assembly incorporating the present invention.

FIGURE 7 is a section view taken along line 7—7 of FIGURE 6.

DESCRIPTION OF THE PREFERRED EMBODIMENT

The credit card mailing device comprises generally an envelope 10, a first foldable member 20 and a second foldable member 30.

As can be seen in FIGURE 1, the envelope 10 is of the conventional type having a front panel 11, sealing flap 12, and rear flaps 13, 14 and 15, said rear flaps being folded and glued to form a pocket in conjunction with front panel 11. A transparent address window 16 is provided in the lower part of front panel 11. The envelope can be fabricated from any commercially available envelope stock, and a design can be printed on the inside of the envelope to prevent its contents from being read through the envelope.

The first foldable member 20 comprises a rectangular sheet of paper stock having a fold line 22 extending transversely of the member intermediate the ends of the same which divides the sheet into two rectangular panels 21 and 23. These panels are substantially equal in area and have a height and width corresponding to the dimensions of envelope 10. Thus, when folded along line 22, foldable member 20 can be inserted and enclosed in envelope 10. An indicia space 24 is provided on one side of panel 23 for the addressee's name and address. When member 20 is folded and inserted into envelope 10, indicia space 24 is in registry with window 16, and the name and address are visible therethrough. Additional information, such as the terms of the credit agreement and instructions on the use of the cards, can be printed on the remaining surface of panel 23 and on both surfaces of panel 21. Because of the construction of envelope 10, such additional information cannot be read either through window 16 or through the remainder of the envelope.

Foldable member 30 comprises a rectangular sheet of paper stock having four parallel fold lines 32, 34, 36 and 38 extending transversely of the sheet which divide the sheet into five rectangular panels. These rectangular panels can be designated first upper flap 31, second upper flap 33, central panel 35, first lower flap 37 and second lower flap 39.

The stock from which foldable member 30 is fabricated is weakened along fold lines 32, 34, 36 and 38 to facilitate proper folding of the member. These lines of weakness can be provided by conventional means, and in the preferred embodiment they consist of lines of perforations.

When the second foldable member 30 is in its folded condition, first upper flap 31 overlies second upper flap 33, first lower flap 37 overlies second lower flap 39, and all four flaps overlie central panel 35, as can best be seen in FIGURE 6. A pocket for holding credit cards is formed between lower flaps 37 and 39 and central panel 35.

The size of second foldable member 30 is such that in its folded condition, it can be inserted in first foldable member 20 and inserted and enclosed therewith in envelope 10. Thus, the height of central panel 35, that is the distance between fold lines 34 and 36 corresponds to the height of envelope 10. The height of first lower flap 37, that is the distance between fold lines 36 and 38, corresponds to the height of credit cards 40, and the height of each of upper flaps 31 and 33 is substantially equal to the difference between the heights of central panel 35 and first lower flap 37.

The width of second foldable member 30 and, hence, first foldable member 20 and envelope 10 corresponds to the width of credit cards 40. Thus, second foldable member 30 is wide enough to accommodate two credit cards 40 side by side without overlapping of the cards at the center or protusion from the sides of member 30.

In its folded condition, the second foldable member 30 provides a unit of substantially uniform thickness, in which the presence of credit cards 40 is difficult to detect. The heavier the stock used for member 30, the more difficult it is to detect the presence of cards 40. Likewise, the heavier stock affords greater protection against damage to the cards. Thus, the paper stock of which member 30 is fabricated should generally be heavier than that used for envelope 10 or first foldable member 20, and preferably it should be sufficiently heavy that the thickness of member 30 when folded is greater than the thickness of credit card 40. With credit cards of the conventional rigid plastic kind having raised lettering, I have found 80# Linweave Textra cover stock to be a suitable material for member 30.

Second foldable member 30 also provides space for printing information such as instructions on the use of the credit card and the terms of the credit agreement. It is an ideal place to advise the cardholder of his rights and liabilities should the card be lost or stolen.

Use of the credit card mailing assembly may now be briefly described as follows. Let it be assumed that envelope 10 has been assembled and that the cardholder's name and address have been entered in indicia space 24 on first foldable member 20.

The folding of first foldable member 30 and the insertion of credit cards 40 therein can best be understood with reference to FIGURE 5. The second lower flap 39 is folded up along fold line 38, as indicated by arrow 58, to overlie the lower portion of first lower flap 37. Credit cards 40 are then inserted between flaps 39 and 37, as indicated by arrows 60, until the lower edge of the cards abuts the fold between the flaps. Flaps 37 and 39 and cards 40 are folded up as a unit along fold line 36, as indicated by arrow 56, to overlie the lower portion of central panel 35. Upper flaps 31 and 33 are folded down along fold line 34, as indicated by arrow 54, to overlie the upper portion of central panel 35. First upper flap 31 is then folded up along fold line 32, as indicated by arrow 52 to overlie second upper flap 33 and the upper portion of central panel 35.

As can best be seen in FIGURE 6, first foldable member 20 is folded along fold line 22, so that rectangular panel 23 overlies panel 21 and indicia space 24 is oriented for registry with address window 16 when member 20 is inserted into envelope 10. The assembly consisting of second foldable member 30 and credit cards 40 is inserted between panels 21 and 23 of member 20, and the entire assembly of member 30 credit cards 40 and member 20 is inserted into envelope 10. Flap 12 of envelope 10 is folded down and sealed by conventional means.

While the credit card mailing device has been described in terms of two credit cards, it may equally well be used for only one card. Where more than two cards are to be sent, the assembly could be made wider to accommodate the cards side by side or, alternatively, the cards could be stacked on top of each other and a thicker paper stock be used for the assembly.

Also, a conventional envelope having a solid front panel can be used instead of the windowed envelope shown in the drawing. When a non-windowed envelope is used, the addressee's name and address are imprinted upon the outer surface of the front panel by conventional means such as writing or typing, and information can be printed on all surfaces of first foldable member 20.

It is apparent from the foregoing, that I have provided a new and improved credit card mailing assembly which provides protection against both theft of and damage to the cards.

I claim:

1. A credit card mailing assembly comprising an envelope, a first foldable member adapted for insertion and enclosure in said envelope, and a second foldable member adapted for insertion and enclosure in said first foldable member and also in said envelope, said second foldable member being further adapted for folding along at least two fold lines and for holding at least one credit card intermediate said fold lines.

2. An assembly as in claim 1 wherein said envelope has a transparent address window and said first foldable member has an indicia space adapted for registry with the address window in the envelope when said first foldable member is enclosed in said envelope.

3. An assembly as in claim 1 wherein said first foldable member comprises a substantially rectangular sheet of paper stock having a fold line parallel to two opposing edges of said sheet dividing said sheet into two panels of substantially equal size, said panels being adapted for folding to overlie each other.

4. In a credit card mailing assembly, an envelope, a first foldable member adapted for insertion and enclosure in said envelope, and a second foldable member adapted for insertion in said first foldable member and in said envelope, said second foldable member being further adapted for holding at least one credit card and comprising a substantially rectangular sheet of paper stock having four fold lines parallel to two opposing edges of said sheet dividing said sheet into a first upper flap, a second upper flap, a central panel, a first lower flap and a second lower flap, said sheet being adapted for folding so that in the folded condition said first upper flap overlies said second upper flap and said first and second upper flaps together overlie an upper portion of said central panel, and said first lower flap overlies said second lower flap and also a lower portion of said central panel, whereby a pocket for holding the credit card is formed between said first and second lower flaps and said central panel.

5. An assembly as in claim 4 wherein said central panel is substantially equal in height to said envelope, said first lower flap has a height corresponding to that of the credit card, and said first and second upper flaps have heights corresponding to the difference in the heights of said central panel and said first lower flap.

6. An assembly as in claim 4 wherein said fold lines are perforated lines.

7. An assembly as in claim 4 wherein said paper stock is thicker than the paper stock of which the first folding member is made.

8. An assembly as in claim 4 wherein said paper stock is at least one-third as thick as the credit card.

9. A credit card mailing assembly including an envelope, a first foldable member adapted for insertion and enclosure in said envelope, said first foldable member comprising a sheet of rectangular paper stock having a fold line dividing the sheet into two rectangular panels of substantially equal size, a second foldable member adapted for insertion and enclosure in said first foldable member and also in said envelope, said second foldable member comprising a sheet of rectangular paper stock having four parallel fold lines dividing said sheet into first and second upper flaps, a central panel and first and second lower flaps, said sheet being adapted for folding so that in the folded condition said first upper flap overlies said second upper flap and said first and second upper flaps together overlie an upper portion of said central panel, and said first lower flap overlies said second lower flap and also a lower portion of said central panel, whereby a pocket for holding credit cards is formed between said first and second lower flaps and said central panel, and at least one rigid credit card disposed in said pocket, the paper stock of said second foldable member being of a sufficient weight and thickness that when said first and second foldable members are folded and enclosed with the credit card in said envelope, the entire assembly has a substantially uniform thickness and rigidity, thereby making it difficult to feel the presence of the credit card in the assembly.

10. In a credit card mailing assembly, a foldable member adapted for holding a credit card and comprising a substantially rectangular sheet of paper stock having four fold lines parallel to two opposing edges of said sheet dividing said sheet into a first upper flap, a second upper flap, a central panel, a first lower flap and a second lower flap, said sheet being adapted for folding so that in the the folded condition said first upper flap overlies said second upper flap and said first and second upper flaps together overlie an upper portion of said central panel, and said first lower flap overlies said second flap and also a lower portion of said central panel, whereby a pocket for holding the credit card is formed between said first and second lower flaps and said central panel.

11. An assembly as in claim 10 wherein said paper stock is of sufficient weight and thickness that when said foldable member is folded and holding a credit card, the combination of said foldable member and credit card has a substantially uniform thickness and rigidity, making the presence of the credit card difficult to detect.

References Cited

UNITED STATES PATENTS

| | | | |
|---|---|---|---|
| 849,771 | 4/1907 | Cooke | 229—92.7 |
| 2,941,711 | 6/1960 | Biek | 229—73 |
| 3,190,541 | 6/1965 | McLaughlin | 229—92.8 |

DAVID M. BOCKENEK, Primary Examiner

U.S. Cl. X.R.

229—92.8